(12) United States Patent
Wang

(10) Patent No.: US 11,122,016 B2
(45) Date of Patent: *Sep. 14, 2021

(54) WIRELESS DISPLAY STREAMING OF PROTECTED CONTENT

(71) Applicant: Intel Corporation, Santa Clara, CA (US)

(72) Inventor: Changliang Wang, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,989

(22) Filed: Apr. 6, 2020

(65) Prior Publication Data

US 2020/0336471 A1 Oct. 22, 2020

Related U.S. Application Data

(63) Continuation of application No. 15/199,868, filed on Jun. 30, 2016, now Pat. No. 10,616,184.

(51) Int. Cl.
*H04L 29/06* (2006.01)
*H04L 9/08* (2006.01)
(Continued)

(52) U.S. Cl.
CPC .......... *H04L 63/0428* (2013.01); *G06F 21/10* (2013.01); *G06F 21/105* (2013.01); *H04L 9/088* (2013.01); *H04L 9/14* (2013.01); *H04L 9/3247* (2013.01); *H04L 65/4084* (2013.01); *H04L 65/602* (2013.01); *H04L 65/607* (2013.01); *H04L 67/104* (2013.01);
(Continued)

(58) Field of Classification Search
CPC . H04L 63/0428; H04L 9/088; H04L 2209/80; H04L 65/602; H04L 65/4084; H04L 9/14; H04L 65/607; H04L 67/104; H04L 9/3247; H04L 2209/76; H04L 2209/603; H04N 21/4363; H04N 21/2347; H04N 21/2541; H04N 21/43637; H04N 21/4627; G06F 2221/2107; G06F 21/10; G06F 21/105; H04W 12/02; H04W 84/12; H04W 76/10; H04W 12/08
USPC ........................................................ 380/236
See application file for complete search history.

(56) References Cited

U.S. PATENT DOCUMENTS 7,003,790 B1 * 2/2006 Inoue ..................... H04H 60/31
725/10
7,684,568 B2 * 3/2010 Yonge, III .......... H04L 63/0478
380/262

(Continued)

FOREIGN PATENT DOCUMENTS

WO 2018004888 A1 1/2018

OTHER PUBLICATIONS

"U.S. Appl. No. 15/199,868, Notice of Allowance dated Nov. 21, 2019", 12 pgs.

(Continued)

*Primary Examiner* — Badri Narayanan Champakesan
(74) *Attorney, Agent, or Firm* — Schwegman Lundberg & Woessner, P.A.

(57) ABSTRACT

A system and method of wireless display, including a transmitter processing a first encrypted content into a second encrypted content without decoding, and transferring the second encrypted content over a wireless display connection to a receiver.

22 Claims, 8 Drawing Sheets

(51) Int. Cl.

| | |
|---|---|
| *H04W 12/02* | (2009.01) |
| *G06F 21/10* | (2013.01) |
| *H04W 76/10* | (2018.01) |
| *H04L 9/14* | (2006.01) |
| *H04L 9/32* | (2006.01) |
| *H04L 29/08* | (2006.01) |
| *H04N 21/2347* | (2011.01) |
| *H04N 21/254* | (2011.01) |
| *H04N 21/4363* | (2011.01) |
| *H04N 21/4627* | (2011.01) |
| *H04W 12/08* | (2021.01) |
| *H04W 84/12* | (2009.01) |
| *H04W 12/03* | (2021.01) |

(52) U.S. Cl.
CPC ..... *H04N 21/2347* (2013.01); *H04N 21/2541* (2013.01); *H04N 21/4363* (2013.01); *H04N 21/43637* (2013.01); *H04N 21/4627* (2013.01); *H04W 12/03* (2021.01); *H04W 76/10* (2018.02); *G06F 2221/2107* (2013.01); *H04L 2209/603* (2013.01); *H04L 2209/76* (2013.01); *H04L 2209/80* (2013.01); *H04W 84/12* (2013.01)

(56) References Cited

U.S. PATENT DOCUMENTS

| | | | |
|---|---|---|---|
| 8,027,474 B2 | 9/2011 | Huang et al. | |
| 8,744,081 B2 | 6/2014 | Christison | |
| 10,104,342 B2 | 10/2018 | Nanda et al. | |
| 10,616,184 B2 | 4/2020 | Wang | |
| 2005/0123138 A1* | 6/2005 | Abe | H04W 12/04 380/255 |
| 2005/0183120 A1* | 8/2005 | Jain | H04N 21/2225 725/46 |
| 2006/0190803 A1* | 8/2006 | Kawasaki | H04N 19/89 714/821 |
| 2007/0116277 A1* | 5/2007 | Ro | H04N 7/167 380/201 |
| 2007/0124474 A1* | 5/2007 | Margulis | G06F 3/14 709/226 |
| 2007/0201691 A1* | 8/2007 | Kumagaya | G11B 20/00449 380/30 |
| 2007/0201693 A1* | 8/2007 | Ohno | H04N 21/8455 380/201 |
| 2008/0244097 A1* | 10/2008 | Candelore | H04N 21/43615 710/5 |
| 2009/0135311 A1 | 5/2009 | Kurita et al. | |
| 2010/0014594 A1* | 1/2010 | Beheydt | H04N 21/23608 375/240.26 |
| 2010/0146292 A1* | 6/2010 | Shi | H04L 9/321 713/189 |
| 2010/0146293 A1* | 6/2010 | Shi | G06F 21/10 713/189 |
| 2010/0146501 A1* | 6/2010 | Wyatt | G06F 21/84 718/1 |
| 2010/0027225 A1 | 10/2010 | Beals | |
| 2010/0272257 A1* | 10/2010 | Beals | H04N 5/44543 380/216 |
| 2011/0135090 A1* | 6/2011 | Chan | H04N 21/63345 380/210 |
| 2011/0317770 A1* | 12/2011 | Lehtiniemi | H04N 19/42 375/240.25 |
| 2012/0257750 A1 | 10/2012 | Bohm et al. | |
| 2012/0308008 A1* | 12/2012 | Kondareddy | H04N 21/4405 380/273 |
| 2013/0061045 A1* | 3/2013 | Kiefer | H04L 9/0819 713/160 |
| 2013/0283393 A1 | 10/2013 | Hierro et al. | |
| 2014/0010367 A1* | 1/2014 | Wang | H04N 21/4122 380/210 |
| 2014/0201776 A1* | 7/2014 | Minemura | H04N 21/4622 725/25 |
| 2015/0156270 A1* | 6/2015 | Teraoka | G06F 21/62 709/219 |
| 2015/0295903 A1* | 10/2015 | Yi | H04L 63/0457 713/153 |
| 2016/0014172 A1 | 1/2016 | Van De Laar et al. | |
| 2016/0073155 A1 | 3/2016 | Subramaniam et al. | |
| 2016/0119292 A1* | 4/2016 | Kaseda | H04L 9/14 713/165 |
| 2016/0142746 A1* | 5/2016 | Schuberth | H04N 21/2146 725/31 |
| 2016/0205397 A1 | 7/2016 | Martin et al. | |
| 2016/0277768 A1 | 9/2016 | Sadhwani et al. | |
| 2017/0149749 A1 | 5/2017 | Rabii et al. | |
| 2018/0007013 A1* | 1/2018 | Wang | H04L 67/104 |

OTHER PUBLICATIONS

"U.S. Appl. No. 15/199,868, Non Final Office Action dated Aug. 1, 2019", 10 pgs.

"U.S. Appl. No. 15/199,868, Response filed Nov. 1, 2019 to Non Final Office Action dated Aug. 1, 2019", 18 pgs.

"U.S. Appl. No. 15/199,868, Supplemental Amendment filed Nov. 7, 2019", 13 pgs.

"International Application Serial No. PCT US2017 034258, Written Opinion dated Aug. 28, 2017", 10 pgs.

"International Application Serial No. PCT US2017 034258, International Preliminary Report on Patentability dated Jan. 10, 2019", 12 pgs.

International Search Report for related PCT Application No. PCT/US2017/034258 dated Aug. 28, 2017, 3 pages.

* cited by examiner

300

WIRELESS DISPLAY STREAMING OF PROTECTED CONTENT

CROSS REFERENCED TO RELATED APPLICATION

The present application is a continuation application of U.S. patent application Ser. No. 15/199,868 by Changliang Wang, entitled "Wireless Display Streaming of Protected Content," filed Jun. 30, 2016, and which is incorporated herein by reference.

TECHNICAL FIELD

The present techniques relate generally to wireless display, and more particularly, to streaming of content via wireless display.

BACKGROUND ART

A peer-to-peer wireless connection or direct wireless connection, such as with Wi-Fi Direct®, provides for wireless coupling of devices without a wireless access point (AP) router. Further, wireless display technology, such as Miracast™, may employ Wi-Fi Direct® to stream video and audio content wirelessly from a computing device such as a laptop, smartphone, or tablet, to a second device such as a monitor, television, or other computing device. In some cases, adapters may be employed on the receiver. For instance, adapters are available that plug into high definition multimedia interface (HDMI) ports or universal serial bus (USB) ports that enable non-Miracast devices to connect via Miracast™.

Miracast™ is a certification program of the Wi-Fi Alliance. Devices that are Miracast™ certified have a software implementation based on the Wi-Fi Display technical specification. The Wi-Fi Alliance maintains a current list of Miracast-certified devices. The sender and the receiver devices generally may be Miracast™ certified for the technology to function. However, as mentioned, to stream music and movies to a non-certified device, Miracast™ adapters are available that plug into HDMI or USB ports. Moreover, the technology may generally work across devices, regardless of brand. Miracast™ devices negotiate settings for each connection, which may simplify the process for the users. In the competitive business of consumer electronics and services, there exists an ongoing need for continuous improvement in implementation, reliability, affordability, and so forth.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1A:
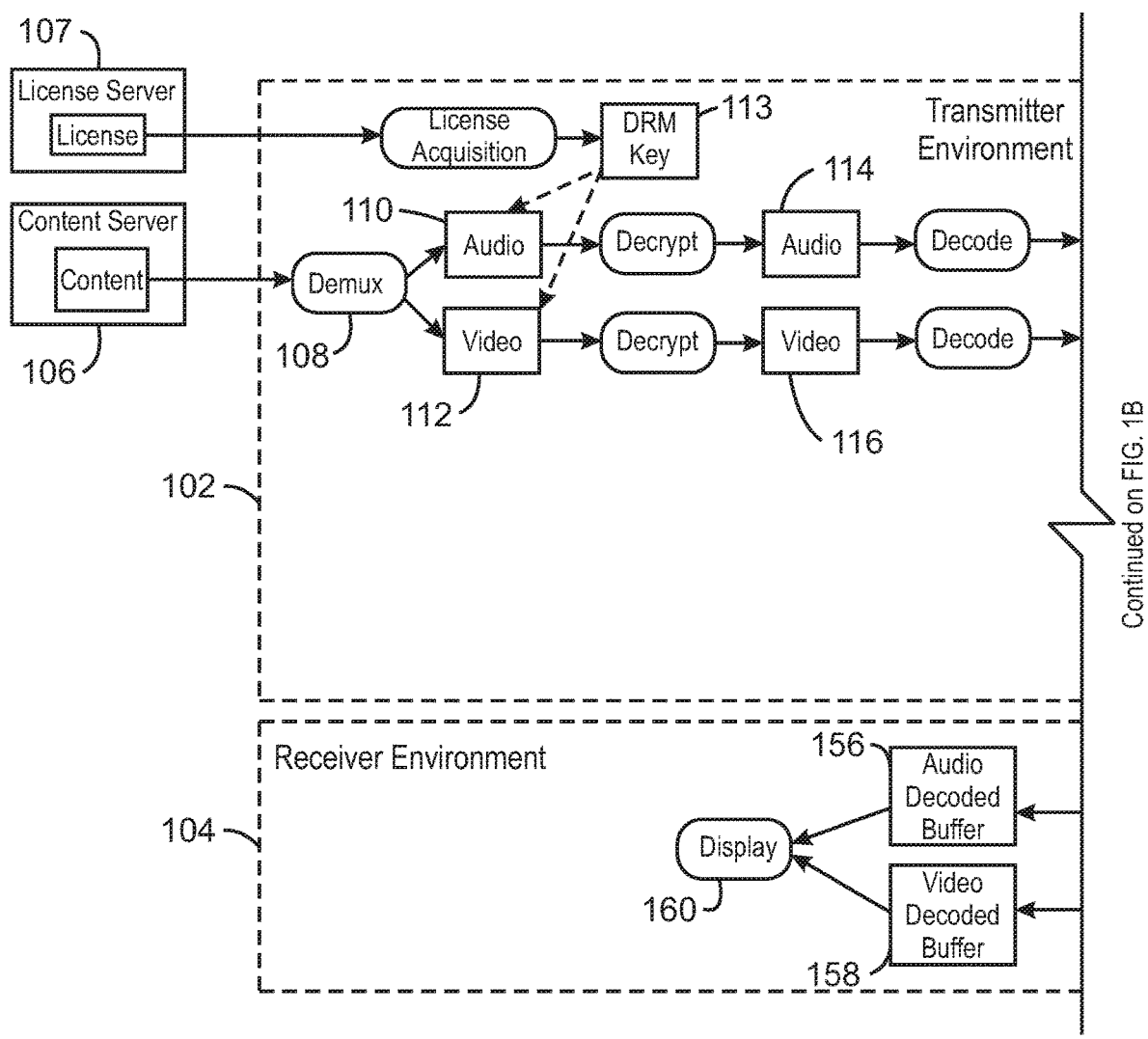
FIGS. 1A and 1B are a block diagram of a system for wireless display.

The present techniques relate generally to wireless display (e.g., Miracast™, Apple AirPlay®, Google Chromecast™, etc.), and more particularly, to streaming protected content via the wireless display connection. In accordance with present examples, a wireless display standard, such as Miracast™, may provide for direct streaming by a transmitter to send video content to a receiver without the transmitter decoding and encoding the video. A specific example provides for direct streaming and content protection via wireless display services such as with Miracast™ revision two (R2) and later revisions.

Embodiments accommodate wirelessly streaming audio/video from a transmitter (e.g., a computing device) to a receiver over a wireless connection (e.g., wireless direct, peer-to-peer, Wi-Fi Direct®, etc.) and a wireless display connection (e.g., a Miracast™ connection, Apple AirPlay® connection, Google Chromecast™ connection, etc.). Some examples are applicable to various standards, such as the Miracast™ standard including revision two (R2) expected in 2017 and later revisions. However, other examples are not limited to a particular standard. Further, while the discussion herein may focus on Miracast™, the present techniques are applicable to other standards and wireless display services. For instance, some embodiments are applicable to Apple AirPlay®, Google Chromecast™, and other wireless display standards and connections. Indeed, the techniques may be applicable to wireless display service connections generally in which video, audio, data, etc. are transmitted wirelessly from a transmitter to a receiver. Moreover, while Wi-Fi Direct® generally does not require an access point (AP) router, some examples of the techniques may accommodate Wi-Fi via an AP router.

Embodiments herein further direct protected content. Indeed, in certain embodiments, the protected content may be streamed from the transmitter to the receiver via the wireless display without transmitter actions of decoding, composing, and/or encoding the video stream. Such may be useful, for example, with low-processing devices (e.g., smartphone or tablet) as the transmitter that have limited processing capability to handle decoding, composing, and encoding. A particular example handles protected content license acquisition and transcryption, e.g., from a Digital Rights Management (DRM) key to a High Definition Copy Protocol (HDCP2) key, on the transmitter side and, therefore, may avoid Miracast™ revision one (R1) style flow and enable R2 direct streaming.

In a typical protected content license acquisition and transcryption using Miracast™ R1 flow, the following may be implemented: license acquisition and DRM key extraction, HDCP2 authentication, decrypt using DRM key, decode, compose with User Interface (UI), encode, and encrypt with HDCP2 key. In contrast, embodiments (including with R2) may avoid the decode, compose, and/or encode actions on the transmitter side, and implement the protected playback content with the transmitter as follows: license acquisition and DRM key extraction, HDCP2 authentication, decrypt using DRM key, and encrypt with HDCP2 key. Thus, with certain embodiments of this latter implementation, the processing of up to three work items (decode, compose, and encode) or more may be avoided by the transmitter. These work items may be relatively heavy duty. The avoidance of these work items by the transmitter may reduce processor (e.g., graphic processing unit or GPU) workload on the transmitter side, reduce latency, reduce power consumption, and/or improve performance, and so forth.

Figure 1B:
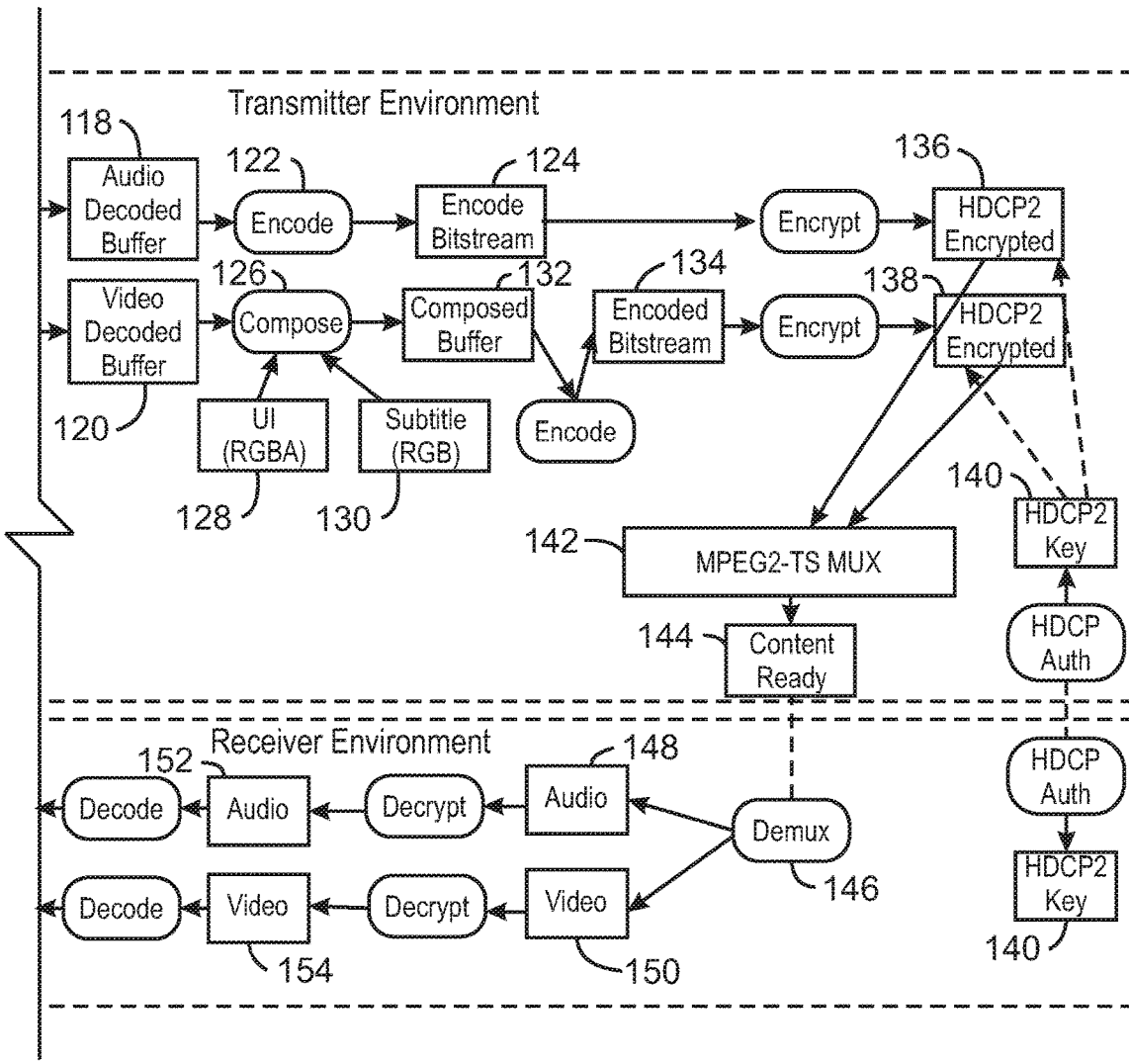

FIGS. 1A and 1B are a wireless display system 100 for streaming of content from a transmitter 102 to a receiver 104. The transmitter 102 and the receiver 104 may each be a computing device such as a smartphone, tablet, laptop, desktop, monitor, television, etc. In some examples, the transmitter 102 is a smaller device such as a smartphone or tablet, and the receiver 104 is a larger device such as a monitor or television. As discussed with respect to FIG. 3 below, each device may have memory and a processor. The processors of the transmitter 102 and the receiver 104 may each be one or more processors, and include more than one core. The processors may be a microprocessor, central processing unit (CPU), graphics processing unit (GPU), and so on. The memory of the transmitter 102 and the receiver 104 may each include nonvolatile and volatile memory.

An example of a wireless display services standard is the Miracast™ standard. Some variations of FIGS. 1A and 1B may be for Miracast™ R1 or other standards. The depicted actions may represent code (logic, instructions) stored in memory and executed by a processor. Of course, the actions depicted may be implemented via the indicated hardware (wires, cables, buffers, mediums, conductors, demux, mux, etc.) of the transmitter 102 and the receiver 104.

In the illustrated embodiment, a content server 106 provides content, and a license server 107 provides a license. The content may be video and/or audio. The transmitter 102 may receive the content. Again, FIGS. 1A and 1B may accommodate the Miracast™ R1 design for protected content playback. A DRM license acquisition via the license server 107 may establish the authentication between the content server 106 and the client (transmitter 102), so that with the license acquisition, the client may be capable to decrypt content by having the DRM content key (for audio and video).

A demultiplex (demux) 108 of the transmitter 102 may split the content into audio 110 and video 112. Moreover, as indicated, a key 113 (e.g., a DRM key) obtained via the license acquisition may be used by the transmitter 102 to decrypt the audio and video streams to give decrypted audio 114 and decrypted video 116. Thus, the transmitter 102 decrypts the incoming DRM bitstream.

Continuing in the transmitter 102 environment, these decrypted streams may be decoded to an audio decoded buffer 118 and video decoded buffer 120, respectively. Such consumes decoder duty cycle. Further, in the illustrated example, the audio may be encoded 122 to give an encoded bitstream 124. As for the video, the video may be composed 126 with any UI 128 and/or subtitle 130 to a composed buffer 132, and then encoded to give an encoded bitstream 134. In other words, if there is a UI content and/or subtitle, the transmitter 102 may compose the UI and/or subtitle along with the video content. This may require significant GPU time, especially for 4 k content, for instance. As for the encoding after composition, the uncompressed buffer is encoded and output as a bitstream, which again this action may be heavy duty with the GPU/encoder.

The transmitter 102 may encrypt the encoded bitstreams 124 and 134 to give HDCP2 encrypted audio content 136 and HDCP2 encrypted video content 138, respectively. This encryption may be performed via an HDCP2 key 140 obtained in the HDCP2 negotiation and authorization between the transmitter 102 and the receiver 104. The HDCP authentication may involve a key exchange between receiver 104 and transmitter 102 and, thus, at the end of the flow, the transmitter 102 having a HDCP2 key to encrypt content.

The encrypted streams may be sent to a multiplexer (mux) 142 and with the content ready for wireless display transfer to the receiver 104, as indicated by reference numeral 144. In the illustrated embodiment, the mux 142 includes a Moving Picture Experts Group (MPEG)-2 transport stream (MPEG2-TS) as a standard container format for transmission and storage of audio, video, and Program and System Information Protocol (PSIP) data. Thus, the mux 142 may include a container for broadcast systems for audio, video, and data.

The receiver 104 receives the content, and divides the content via a demux 146 into an audio 148 stream and a video 150 stream, both of which may be decrypted (using the key 140) to give decrypted audio 152 and decrypted video 154. The receiver 104 may decode this decrypted content to an audio decoded buffer 156 and a video decoded buffer 158 for play and display at the receiver 104, as indicated by reference numeral 160.

Figure 2A:
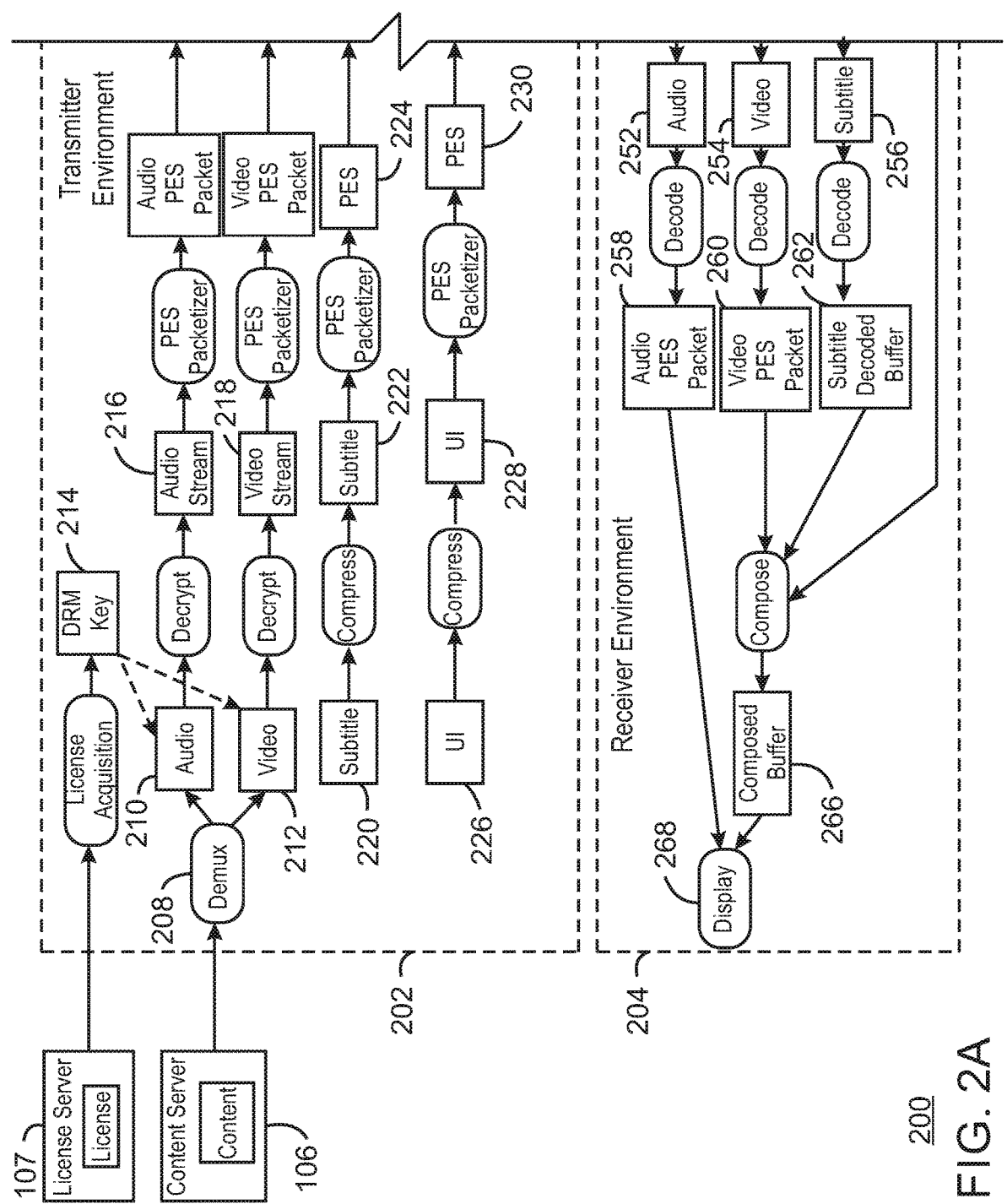
FIGS. 2A and 2B are a block diagram of a system for wireless display in accordance with embodiments of the present techniques.
Figure 2B:
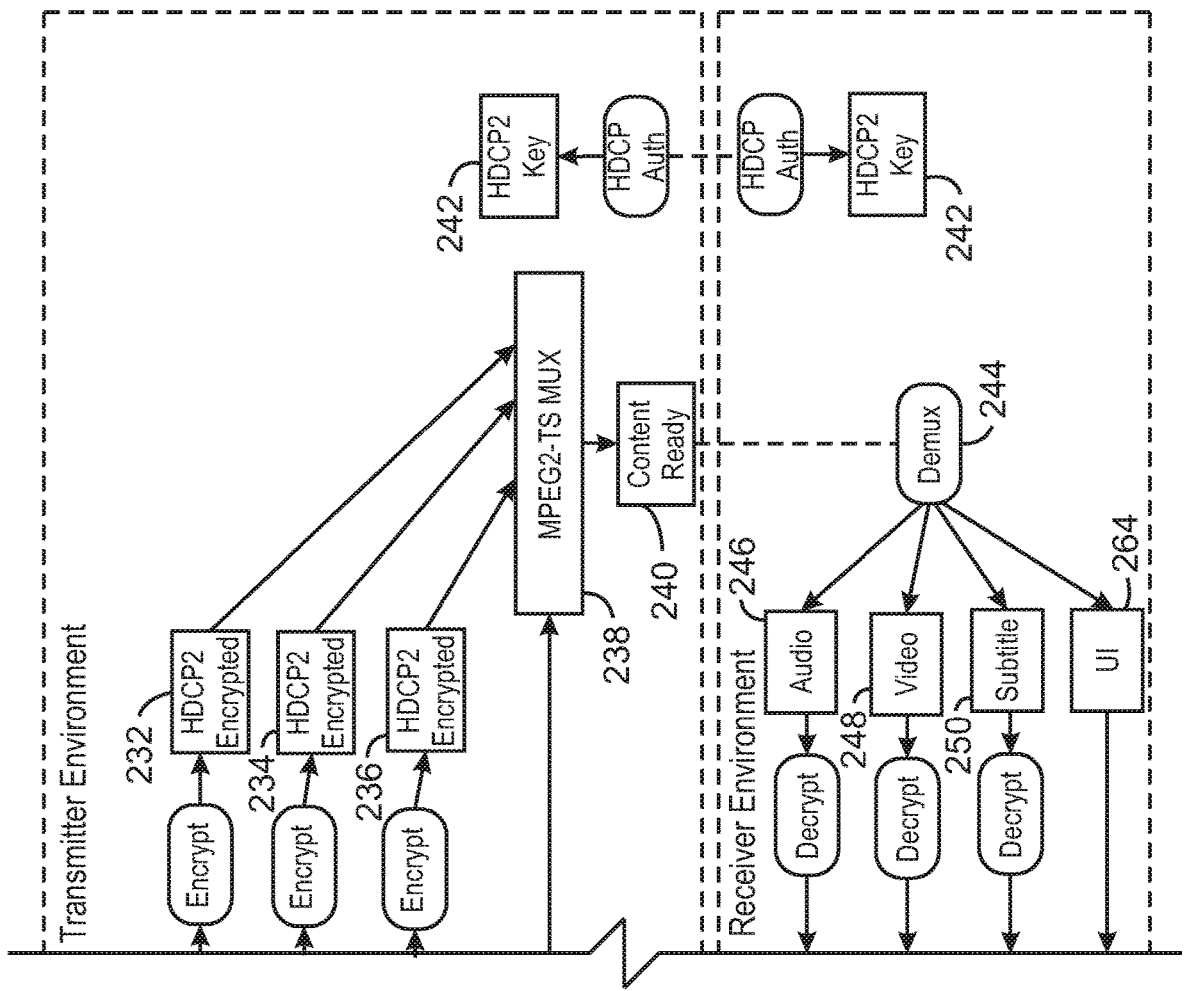

FIGS. 2A and 2B are a wireless display system 200 for streaming of content from a transmitter 202 to a receiver 204. Embodiments may provide for a direct streaming mode. In order to send the media content in native encoding formats without the need of decoding and re-encoding, the audio, video, and image content provided from the media application in the source device may be sent as separate elementary streams. Features such as UI, subtitle, scaling, alpha blending, and the like, may be accommodated. Moreover, the system 200 may handle protected content.

As with the devices of FIGS. 1A and 1B, the transmitter 202 and the receiver 204 in FIGS. 2A and 2B may each be a computing device such as a smartphone, tablet, laptop, desktop, monitor, television, etc. In some examples, the transmitter 202 is a smaller device such as a smartphone or tablet, and the receiver 204 is a larger device such as a monitor or television. As discussed with respect to FIGS. 1A, 1B, and 3, the transmitter and receiver may each have memory and a processor. The transmitter 202 processor and the receiver 204 processor may each be one or more processors, and include more than one core. The processor may be a microprocessor, central processing unit (CPU), graphics processing unit (GPU), and so on. The transmitter 202 memory and the receiver 204 memory may each include nonvolatile and volatile memory.

As mentioned, an example of a wireless display services standard is the Miracast™ standard. Some variations of FIGS. 2A and 2B may be for Miracast™ R2 or other standards. The depicted actions may represent code (logic, instructions) stored in memory and executed by a processor. Of course, the actions depicted may be implemented via the indicated hardware (wires, cables, buffers, mediums, conductors, demux, mux, etc.) of the transmitter 202 and the receiver 204.

In the illustrated embodiment, a content server 106 provides content, and a license server 107 provides a license to use the content. The content may be video and/or audio. The transmitter 202 may receive the content. Again, in certain examples, FIGS. 2A and 2B may accommodate the Miracast™ R2 design for protected content playback. In the illustrated example, the transmitter 202, via a demux 208, splits the content into audio 210 and video 212. The transmitter 202 employs the key 214 (e.g., a DRM key) obtained in the license acquisition to decrypt the audio and video to give a decrypted audio stream 216 and a decrypted video stream 218.

In instances with a subtitle 210, the subtitle may be compressed to give a compressed subtitle 222 which may be subjected to a packetized elementary stream (PES) packetizer to give a subtitle PES 224. As for a UI 226 stream, the UI 226 may be compressed by the transmitter 202 to give a compressed UI 228 which may also be subjected to a PES packetizer to give a UI PES 230. Further, in certain embodiments, the audio stream 216 and the video stream 218 may each be sent through a PES packetizer to give a video PES packet and audio PES packet, respectively, and then encrypted (along with the subtitle PES 224) to give HDCP2 encrypted content 232, 234, and 236. No decoding is performed. Lastly, these streams 232, 234, 236 along with the UI PES 230 may be sent to a MPEG2-TS mux 238, and with the content ready for transfer, as indicated by reference numeral 240. Moreover, the aforementioned encryption may be performed with a key 242 (e.g., a HDCP key such as a HDCP2 key) obtained with an HDCP authorization negotiation between the transmitter 202 and the receiver 204.

The receiver 204 receives the content and divides, via a demux 244, the content into audio 246, video 248, and the subtitle 250 (if there is a subtitle). The streams may be decrypted via the key 242 to give decrypted audio 252, decrypted video 254, and the decrypted subtitle 256, all of which may be decoded into an audio decoded buffer 258, a video decoded buffer 260, and subtitle decoded buffer 262, respectively. Further, the receiver 204 via the demux 244, may split the UI 264 from the received content. The UI 264 along with the decoded video and decoded subtitle may be composed into a composed buffer 266 which may, along with the decoded audio, feed the display 268.

Figure 3:
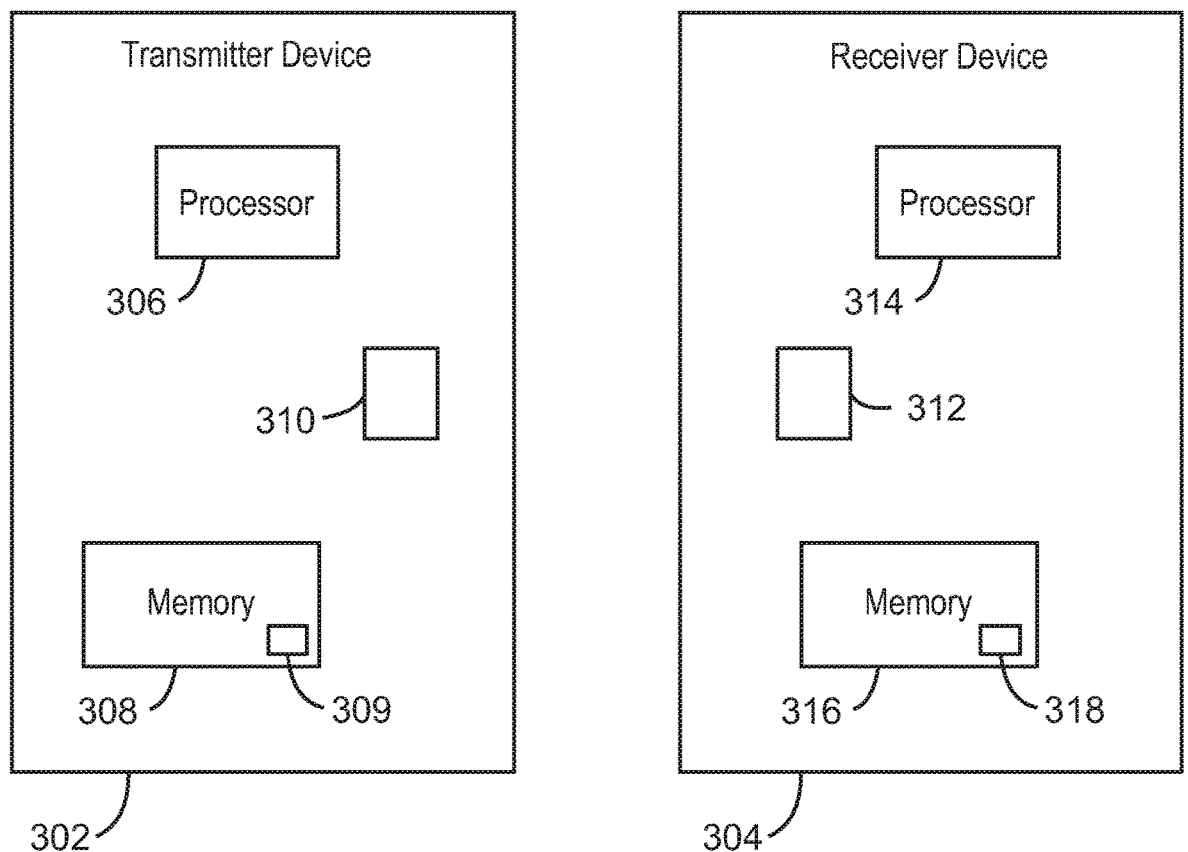
FIG. 3 is a block diagram of a system for wireless display in accordance with embodiments of the present techniques.

FIG. 3 is a system 300 providing for wireless display. The system 300 may be similar or identical to the system 200 of FIGS. 2A and 2B. A wireless display (e.g., Miracast™) connection may be established between a transmitter 302 (e.g., computing device) and a receiver 304. Indeed, embodiments accommodate wirelessly streaming audio/video from the transmitter 302 to the receiver 304 over a wireless connection (e.g., Wi-Fi Direct®) and a wireless display connection (e.g., a Miracast™ connection). The transmitter 302 and the receiver 304 may each be a computing device such as a smartphone, tablet, laptop, desktop, monitor, television, dongle, etc. The transmitter 302 has a processor 306 and memory 308 storing code 309 (instructions, logic) executable by the processor 306. The code 309 may be executable by the processor 306 to provide or the actions of the transmitter as discussed with respect to FIGS. 2A and 2B. Indeed, embodiments may provide for a direct streaming mode. In order to send the media content from the transmitter 302 in native encoding formats without decoding and re-encoding, the audio, video, and image content provided from the transmitter 302 may be sent as separate elementary streams. Certain examples may provide for the Miracast™ R2 design for protected content playback. Again, the actions of decoding, coding, and/or composing may be shifted from the transmitter to 302 to the receiver 304. The code 308 when executed by the processor 306 may provide for the transmitter to perform the transcription without decoding (or composing).

In the illustrated embodiment, the transmitter 302 includes a network interface 310 (e.g., network adapter) for a wireless connection. Similarly, the receiver 304 includes a network interface 312 (e.g., network adapter) for a wireless connection. Further, the receiver 304 has a processor 314 and memory 316 storing code 318 executable by the processor 314. The code 318 may provide for the aforementioned actions by the receiver discussed with respect to FIGS. 2A and 2B. Moreover, as indicated, the processors 306 and 314 may each be a microprocessor, hardware processor, CPU, GPU, and so on. The transmitter memory 308 and the receiver memory 316 may each include non-volatile and volatile memory.

Figure 4:
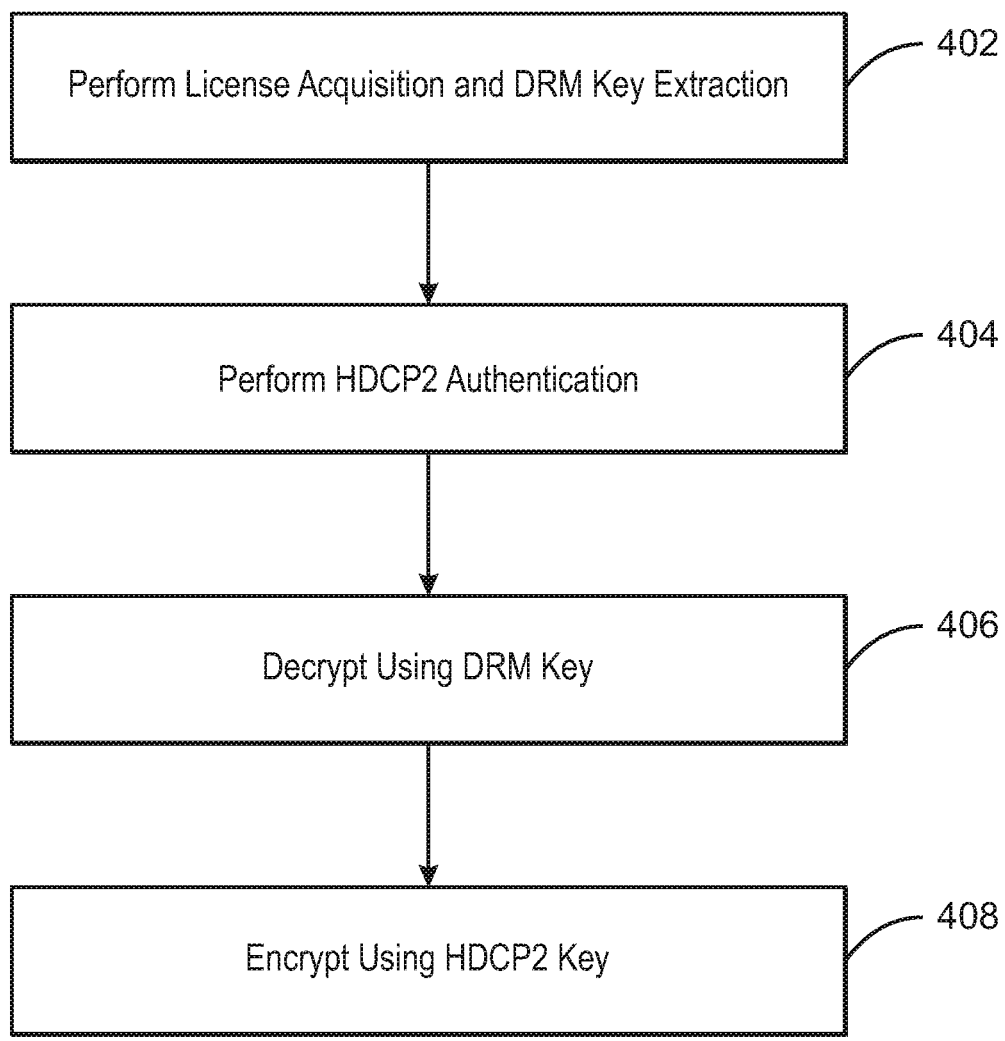
FIG. 4 is a block flow diagram of method for wireless display in accordance with embodiments of the present techniques.

FIG. 4 is a method 400 for wireless display between a transmitter and a receiver, and with the transmitter receiving encrypted content (e.g., video) such as from a content server. The method includes the transmitter performing (block 402) license acquisition and DRM key extraction, and the transmitter performing (block 404) HDCP2 authentication. Indeed, the transmitter decrypts (block 406) the content using a DRM key, and encrypts (block 408) the content using an HDCP2 key such as a HDCP2 key. In certain embodiments, the transmitter performs this transcryption without decoding, encoding, or composing, and sends the HDCP-encrypted content to the receiver over the wireless display connection.

Figure 4A:
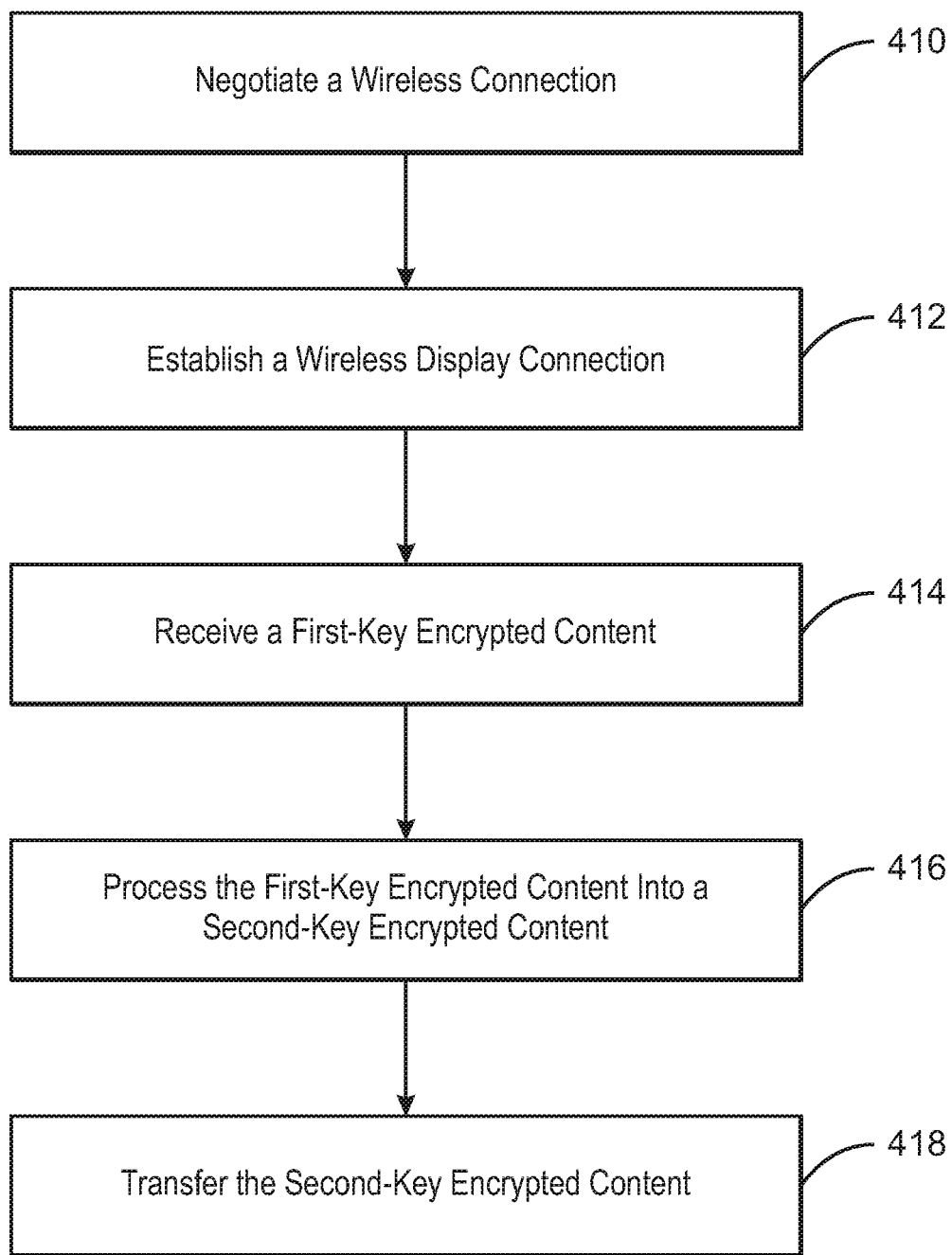
FIG. 4A is a block flow diagram of method for wireless display in accordance with embodiments of the present techniques.

FIG. 4A is a method 400A of wireless display between a transmitter and a receiver. At block 410, the method includes negotiating a wireless connection (e.g., Wi-Fi Direct®) between a transmitter and a receiver to wirelessly couple the transmitter and the receiver. At block 412, the method establishes a wireless display connection (e.g., Miracast™) between the transmitter and the receiver. At block 414, the transmitter receives a first encrypted content or a first-key encrypted content. The content may include video, audio, and/or a subtitle. At block 416, the transmitter processes the first encrypted content (e.g., DRM encrypted) into a second encrypted content (e.g., HDCP2 encrypted) or second-key encrypted content (e.g., with the second key as a HDCP2 key). This processing may be performed without decoding, encoding, or composing. Instead, the receiver may perform these actions. At block 418, the transmitter transfers the second encrypted content or second-key encrypted content over the wireless display connection to the receiver.

The method 400A may include the transmitter performing a license acquisition to obtain a first key (e.g., a DRM key), with the processing at block 416 includes decrypting the first encrypted content with the first key, and then encrypting the content with a second key (e.g., HDCP2 key) different from the first key to give the second encrypted content. The processing by the transmitter at block 416 may include dividing the first encrypted content into a first encrypted video and a first encrypted audio, decrypting the first encrypted video to decrypted video, and decrypting the first encrypted audio to decrypted audio. Decrypting the first encrypted video may include decrypting the first encrypted video with the first key, and decrypting the first encrypted audio may include decrypting the first encrypted audio with the first key. Moreover, the transmitter may packetize (e.g., via a PES packetizer) the decrypted video and the decrypted audio. In examples, the transmitter does not decode the decrypted video, and wherein the transmitter does not decode the decrypted audio.

Further, the transmitter processing at block 416 may include encrypting (e.g., via a second key such as a HDCP2 key) the decrypted video to a second encrypted video, encrypting (e.g., via the second key) the decrypted audio to a second encrypted audio, and combining the second encrypted video and the second encrypted audio to give the second encrypted content. Moreover, the processing may include compressing a UI stream and combining the compressed UI stream with the second encrypted video and the second encrypted audio to give the second encrypted content without composing. Further, a subtitle may also be included, as discussed above with respect to FIGS. 2A and 2B. In addition, the method 400A may include the actions of the receiver, as also discussed above with respect to FIGS. 2A and 2B. The operation may include wirelessly streaming video or audio, or both, from the transmitter to the receiver over the wireless connection and the wireless display connection.

As should be apparent for certain embodiments, the DRM encrypted content is not sent to receiver. Thus, the receiver is not required to support that particular DRM scheme, which could be difficult. Receivers may already generally support HDCP decryption. Therefore, in some embodiments, the system and operation may be beneficial with the transmitter to decrypt (DRM) and encrypt (HDCP).

Figure 5:
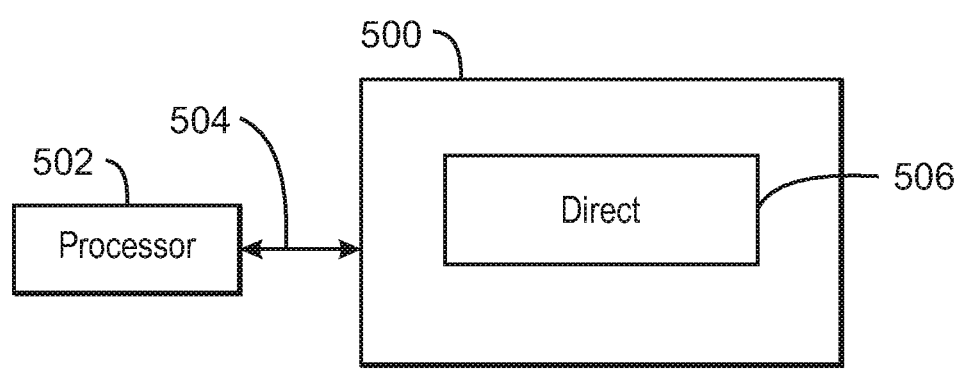
FIG. 5 is a block diagram depicting an example of a tangible non-transitory, computer-readable medium that directs wireless display in accordance with embodiments of the present techniques.

FIG. 5 is a block diagram depicting an example of a tangible non-transitory, computer-readable medium 500 that can facilitate application registration and enablement in a wireless display environment, as discussed above. The computer-readable medium 400 may be accessed by a processor 402 over a computer interconnect 404. The processor 402 may be a processor (e.g., 306) of the computing device. The tangible, non-transitory, computer-readable medium 400 may include executable instructions or code to direct the processor 402 to perform the operations of the techniques described herein.

The various software components discussed herein may be stored on the tangible, non-transitory, computer-readable medium 400, as indicated in FIG. 4. For example, the code may direct the processor to negotiate a wireless connection between a transmitter and a receiver to wirelessly couple the transmitter and the receiver, wherein the transmitter may be the computing device, and establish a wireless display service connection between the transmitter and the receiver. The code may direct the processor to: receive a first encrypted content and divide the first encrypted content into a first encrypted video and a first encrypted audio; decrypt the first encrypted video to give decrypted video, and decrypt the first encrypted audio to give decrypted audio; encrypt the decrypted video to give a second encrypted video without decoding the decrypted video, and encrypt the decrypted audio to give a second encrypted audio without decoding the decrypted audio; combine the second encrypted video and the second encrypted audio into a second encrypted content; and transfer, via the wireless display service connection, the second encrypted content to the receiver.

It should be understood that any number of additional software components not shown in FIG. 4 may be included within the tangible, non-transitory, computer-readable medium 400, depending on the application or other considerations. Moreover, while one module 406 is depicted, additional modules directed to other code and actions may be stored on medium 400.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is a method of wireless display. The method includes negotiating a wireless connection between a transmitter and a receiver to wirelessly couple the transmitter and the receiver; establishing a wireless display connection between the transmitter and the receiver; receiving at the transmitter a first encrypted content; processing, via the transmitter, the first encrypted content into a second encrypted content without decoding; and transferring, via the wireless display connection, the second encrypted content from the transmitter to the receiver.

Example 2 includes the method of example 1, including or excluding optional features. In this example, the wireless connection comprises Wi-Fi Direct®, and wherein the wireless display connection comprises Miracast™.

Example 3 includes the method of any one of examples 1 to 2, including or excluding optional features. In this example, the method includes the transmitter performing a license acquisition to obtain a first key, wherein the processing comprises: decrypting the first encrypted content with the first key; and performing encryption with a second key different than the first key to give the second encrypted content. Optionally, the first key comprises a Digital Rights Management (DRM) key, and wherein the second key comprises a High Definition Copy Protocol (HDCP) key.

Example 4 includes the method of any one of examples 1 to 3, including or excluding optional features. In this example, the processing comprises: dividing the first encrypted content into a first encrypted video and a first encrypted audio; decrypting the first encrypted video to decrypted video, and decrypting the first encrypted audio to decrypted audio; encrypting the decrypted video to a second encrypted video, and encrypting the decrypted audio to a second encrypted audio; and combining the second encrypted video and the second encrypted audio to give the second encrypted content. Optionally, the processing comprises: packetizing the decrypted video; packetizing the decrypted audio; compressing a user interface (UI) stream; and combining the compressed UI stream with the second encrypted video and the second encrypted audio to give the second encrypted content without composing, wherein the first encrypted content comprises a first-key encrypted content, and wherein the second encrypted content comprises a second-key encrypted content Optionally, packetizing comprises subjecting the decrypted audio or decrypted video to a packetized elementary stream (PES) packetizer.

Example 5 is a method of wireless display. The method includes establishing a wireless display connection between a transmitter and a receiver; and performing by the transmitter: dividing a first encrypted content into a first encrypted video and a first encrypted audio; decrypting the first encrypted video to give decrypted video, and decrypting the first encrypted audio to give decrypted audio; encrypting the decrypted video to give a second encrypted video, and encrypting the decrypted audio to give a second encrypted audio; combining the second encrypted video and the second encrypted audio into a second encrypted content; and transferring, via the wireless display connection, the second encrypted content to the receiver.

Example 6 includes the method of example 5, including or excluding optional features. In this example, the method includes negotiating a wireless connection between the transmitter and the receiver to wirelessly couple the transmitter and the receiver, wherein the transmitter does not decode the decrypted video, and wherein the transmitter does not decode the decrypted audio. Optionally, the wireless connection comprises Wi-Fi Direct®, and wherein the wireless display connection comprises Miracast™.

Example 7 includes the method of any one of examples 5 to 6, including or excluding optional features. In this example, the method includes the transmitter receiving the first encrypted content and performing a license acquisition to obtain a first key, wherein decrypting the first encrypted video comprises decrypting the first encrypted video with the first key, and wherein decrypting the first encrypted audio comprises decrypting the first encrypted audio with the first key. Optionally, encrypting the decrypted video comprises encrypting the decrypted video with a second key different than the first key, and wherein encrypting the decrypted audio comprises encrypting the decrypted audio with the second key.

Example 8 includes the method of any one of examples 5 to 7, including or excluding optional features. In this example, the method includes the transmitter packetizing the decrypted video, and the transmitter packetizing the decrypted audio, wherein the first encrypted content comprises a first-key encrypted content, and wherein the second encrypted content comprises a second-key encrypted content.

Example 9 includes the method of any one of examples 5 to 8, including or excluding optional features. In this example, the method includes the transmitter compressing a user interface (UI) stream, and wherein combining into a second encrypted content comprises the transmitter combining the compressed UI stream with the second encrypted video and the second encrypted audio to give the second encrypted content without composing.

Example 10 is a transmitter configured for wireless display. The transmitter configured for wireless display includes a processor; and memory storing instructions that when executed by the processor cause the transmitter to: receive a first encrypted content and divide the first encrypted content into a first encrypted video and a first encrypted audio; decrypt the first encrypted video to give decrypted video, and decrypt the first encrypted audio to give decrypted audio; encrypt the decrypted video to give a second encrypted video without decoding the decrypted video, and encrypt the decrypted audio to give a second encrypted audio without decoding the decrypted audio; combine the second encrypted video and the second encrypted audio into a second encrypted content; and transfer the second encrypted content over a wireless display service connection to a receiver.

Example 11 includes the transmitter configured for wireless display of example 10, including or excluding optional features. In this example, the transmitter is a computing device and is to negotiate a wireless connection with the receiver to wirelessly couple the transmitter and the receiver, wherein the transmitter is to establish over the wireless connection the wireless display service connection between the transmitter and the receiver. Optionally, the wireless connection comprises Wi-Fi Direct®, and wherein the wireless display service connection comprises Miracast™.

Example 12 includes the transmitter configured for wireless display of any one of examples 10 to 11, including or excluding optional features. In this example, to decrypt the first encrypted video comprises decrypting the first encrypted video with the first key, wherein to decrypt the first encrypted audio comprises decrypting the first encrypted audio with the first key, wherein to encrypt the decrypted video comprises encrypting the decrypted video with a second key different from the first key, and wherein to encrypt the decrypted audio comprises encrypting the decrypted audio with the second key. Optionally, the first key comprises a Digital Rights Management (DRM) key, and wherein the second key comprises a High Definition Copy Protocol (HDCP) key.

Example 13 includes the transmitter configured for wireless display of any one of examples 10 to 12, including or excluding optional features. In this example, to combine into a second encrypted content comprises combining the compressed UI stream with the second encrypted video and the second encrypted audio to give the second encrypted content without composing, wherein the first encrypted content comprises a first-key encrypted content, and wherein the second encrypted content comprises a second-key encrypted content.

Example 14 is a tangible, non-transitory, computer-readable medium. The tangible, non-transitory, computer-readable medium includes instructions that direct the processor to receive a first encrypted content and divide the first encrypted content into a first encrypted video and a first encrypted audio; decrypt the first encrypted video to give decrypted video, and decrypt the first encrypted audio to give decrypted audio; encrypt the decrypted video to give a second encrypted video without decoding the decrypted video, and encrypt the decrypted audio to give a second encrypted audio without decoding the decrypted audio; combine the second encrypted video and the second encrypted audio into a second encrypted content; and transfer, via a wireless display service connection, the second encrypted content to a receiver.

Example 15 includes the tangible, non-transitory, computer-readable medium of example 14, including or excluding optional features. In this example, the first encrypted content comprises content encrypted by a first key; the first encrypted video comprises video encrypted by the first key; the first encrypted audio comprises audio encrypted by the first key; the second encrypted content comprises content encrypted by a second key different than the first key; the second encrypted video comprises video encrypted by the second key; and the second encrypted audio comprises audio encrypted by the second key.

Example 16 includes the tangible, non-transitory, computer-readable medium of any one of examples 14 to 15, including or excluding optional features. In this example, the instructions when executed by the processor cause the computing device to: negotiate a wireless connection between a transmitter and the receiver to wirelessly couple the transmitter and the receiver, wherein the transmitter comprises the computing device; establish the wireless display service connection between the transmitter and the receiver; and acquire a license to obtain a first key, wherein to decrypt the first encrypted video comprises decrypting the first encrypted video with the first key, and wherein to decrypt the first encrypted audio comprises decrypting the first encrypted audio with the first key. Optionally, the instructions when executed by the processor cause the computing device to packetize the decrypted video and packetize the decrypted audio, wherein to encrypt the decrypted video comprises encrypting the decrypted video with a second key different from the first key, and wherein to encrypt the decrypted audio comprises encrypting the decrypted audio with the second key.

Example 17 includes the tangible, non-transitory, computer-readable medium of any one of examples 14 to 16, including or excluding optional features. In this example, the instructions when executed by the processor cause the computing device to compress a user interface (UI) stream, and wherein to combine into the second encrypted content comprises combining the compressed UI stream with the second encrypted video and the second encrypted audio to give the second encrypted content without composing. Optionally, the first key comprises a Digital Rights Management (DRM) key. Optionally, the second key comprises a High Definition Copy Protocol (HDCP) key. Optionally, the wireless connection comprises Wi-Fi Direct®.

Example 18 includes the tangible, non-transitory, computer-readable medium of any one of examples 14 to 17, including or excluding optional features. In this example, the wireless display service connection comprises Miracast™.

Example 19 includes the tangible, non-transitory, computer-readable medium of any one of examples 14 to 18, including or excluding optional features. In this example, the wireless display service connection comprises Google Chromecast™.

Example 20 includes the tangible, non-transitory, computer-readable medium of any one of examples 14 to 19, including or excluding optional features. In this example, the wireless display service connection comprises Apple AirPlay®.

Example 21 includes the tangible, non-transitory, computer-readable medium of any one of examples 14 to 20, including or excluding optional features. In this example, the instructions when executed by the processor cause the computing device to packetize the decrypted video and packetize the decrypted audio. Optionally, to packetize the decrypted video comprises subjecting the decrypted video to a packetized elementary stream (PES) packetizer. Optionally, to packetize the decrypted audio comprises subjecting the decrypted audio to a packetized elementary stream (PES) packetizer.

Example 22 is a computing device. The computing device includes means for dividing a first encrypted content into a first encrypted video and a first encrypted audio; means for decrypting the first encrypted video to give decrypted video, and for decrypting the first encrypted audio to give decrypted audio; means for encrypting the decrypted video to give a second encrypted video without decoding the decrypted video, and for encrypting the decrypted audio to give a second encrypted audio without decoding the decrypted audio; means for combining the second encrypted video and the second encrypted audio into a second encrypted content; and means for transferring, via a wireless display service connection, the second encrypted content to a receiver.

Example 23 includes the computing device of example 22, including or excluding optional features. In this example, the first encrypted content comprises content encrypted by a first key; the first encrypted video comprises video encrypted by the first key; the first encrypted audio comprises audio encrypted by the first key; the second encrypted content comprises content encrypted by a second key different than the first key; the second encrypted video comprises video encrypted by the second key; and the second encrypted audio comprises audio encrypted by the second key.

Example 24 includes the computing device of any one of examples 22 to 23, including or excluding optional features. In this example, the computing device includes means for negotiating a wireless connection between a transmitter and the receiver to wirelessly couple the transmitter and the receiver, wherein the transmitter is the computing device; means for establishing the wireless display service connection between the transmitter and the receiver; and means for acquiring a license to obtain a first key, wherein decrypting the first encrypted video comprises decrypting the first encrypted video with the first key, and wherein decrypting the first encrypted audio comprises decrypting the first encrypted audio with the first key. Optionally, the computing device includes means to packetize the decrypted video and packetize the decrypted audio, wherein encrypting the decrypted video comprises encrypting the decrypted video with a second key different from the first key, and wherein encrypting the decrypted audio comprises encrypting the decrypted audio with the second key.

Example 25 includes the computing device of any one of examples 22 to 24, including or excluding optional features. In this example, the computing device includes means for compressing a user interface (UI) stream, and wherein the means for combining comprises means for combining the compressed UI stream with the second encrypted video and the second encrypted audio to give the second encrypted content without composing. Optionally, the first key comprises a Digital Rights Management (DRM) key. Optionally, the second key comprises a High Definition Copy Protocol (HDCP) key. Optionally, the wireless connection comprises Wi-Fi Direct®.

Example 26 includes the computing device of any one of examples 22 to 25, including or excluding optional features. In this example, the wireless display service connection comprises Miracast™.

Example 27 includes the computing device of any one of examples 22 to 26, including or excluding optional features. In this example, the wireless display service connection comprises Google Chromecast™.

Example 28 includes the computing device of any one of examples 22 to 27, including or excluding optional features. In this example, the wireless display service connection comprises Apple AirPlay®.

Example 29 includes the computing device of any one of examples 22 to 28, including or excluding optional features. In this example, the comprises means to packetize the decrypted video and packetize the decrypted audio. Optionally, to packetize the decrypted video comprises subjecting the decrypted video to a packetized elementary stream (PES) packetizer. Optionally, to packetize the decrypted audio comprises subjecting the decrypted audio to a packetized elementary stream (PES) packetizer.

Example 30 is a method of wireless display. The method includes instructions that direct the processor to negotiating a wireless connection between a transmitter and a receiver to wirelessly couple the transmitter and the receiver; establishing a wireless display connection between the transmitter and the receiver; receiving at the transmitter a first encrypted content; processing, via the transmitter, the first encrypted content into a second encrypted content without decoding; and transferring, via the wireless display connection, the second encrypted content from the transmitter to the receiver, wherein the wireless display connection comprises Miracast™, Google Chromecast™, or Apple AirPlay®.

Example 31 includes the method of example 30, including or excluding optional features. In this example, the wireless connection comprises Wi-Fi Direct®.

Example 32 includes the method of any one of examples 30 to 31, including or excluding optional features. In this example, the method includes the transmitter performing a license acquisition to obtain a first key, wherein the processing comprises: decrypting the first encrypted content with the first key; and performing encryption with a second key different than the first key to give the second encrypted content. Optionally, the first key comprises a Digital Rights Management (DRM) key, and wherein the second key comprises a High Definition Copy Protocol (HDCP) key.

Example 33 includes the method of any one of examples 30 to 32, including or excluding optional features. In this example, the processing comprises: dividing the first encrypted content into a first encrypted video and a first encrypted audio; decrypting the first encrypted video to decrypted video, and decrypting the first encrypted audio to decrypted audio; encrypting the decrypted video to a second encrypted video, and encrypting the decrypted audio to a second encrypted audio; and combining the second encrypted video and the second encrypted audio to give the second encrypted content. Optionally, the processing comprises: packetizing the decrypted video; packetizing the decrypted audio; compressing a user interface (UI) stream; and combining the compressed UI stream with the second encrypted video and the second encrypted audio to give the second encrypted content without composing, wherein the first encrypted content comprises a first-key encrypted content, and wherein the second encrypted content comprises a second-key encrypted content Optionally, packetizing the decrypted video comprises subjecting the decrypted video to a packetized elementary stream (PES) packetizer. Optionally, packetizing the decrypted audio comprises subjecting the decrypted audio to a packetized elementary stream (PES) packetizer.

Example 34 is a method of wireless display. The method includes instructions that direct the processor to negotiating a wireless direct connection between a transmitter and a receiver to wirelessly couple the transmitter and the receiver; establishing a wireless display connection between the transmitter and the receiver; receiving at the transmitter a first encrypted content; processing, via the transmitter, the first encrypted content into a second encrypted content without decoding; and transferring, via the wireless display connection, the second encrypted content from the transmitter to the receiver.

Example 35 includes the method of example 34, including or excluding optional features. In this example, the wireless direct connection comprises Wi-Fi Direct®.

Example 36 includes the method of any one of examples 34 to 35, including or excluding optional features. In this example, the wireless direct connection comprises a wireless peer-to-peer connection.

Example 37 includes the method of any one of examples 34 to 36, including or excluding optional features. In this example, the method includes the transmitter performing a license acquisition to obtain a first key. Optionally, the processing comprises decrypting the first encrypted content with the first key. Optionally, the first key comprises a Digital Rights Management (DRM) key. Optionally, the method includes performing encryption with a second key different than the first key to give the second encrypted content. Optionally, the second key comprises a High Definition Copy Protocol (HDCP) key.

Example 38 includes the method of any one of examples 34 to 37, including or excluding optional features. In this example, the processing comprises: dividing the first encrypted content into a first encrypted video and a first encrypted audio; decrypting the first encrypted video to decrypted video, and decrypting the first encrypted audio to decrypted audio; encrypting the decrypted video to a second encrypted video, and encrypting the decrypted audio to a second encrypted audio; and combining the second encrypted video and the second encrypted audio to give the second encrypted content. Optionally, the processing comprises: packetizing the decrypted video; and packetizing the decrypted audio. Optionally, the processing comprises: compressing a user interface (UI) stream; and combining the compressed UI stream with the second encrypted video and the second encrypted audio to give the second encrypted content without composing.

Example 39 includes the method of any one of examples 34 to 38, including or excluding optional features. In this example, the first encrypted content comprises a first-key encrypted content, and wherein the second encrypted content comprises a second-key encrypted content.

Example 40 is a transmitter configured for wireless display and comprising a processor and memory storing instructions, wherein the transmitter is a computing device and is to negotiate a wireless direct connection with a receiver. The instructions when executed by the processor cause the transmitter to: receive a first encrypted content and divide the first encrypted content into a first encrypted video and a first encrypted audio; decrypt the first encrypted video to give decrypted video, and decrypt the first encrypted audio to give decrypted audio; encrypt the decrypted video to give a second encrypted video without decoding the decrypted video, and encrypt the decrypted audio to give a second encrypted audio without decoding the decrypted audio; combine the second encrypted video and the second encrypted audio into a second encrypted content; and transfer the second encrypted content over a wireless display service connection to the receiver.

Example 41 includes the transmitter configured for wireless display of example 40, including or excluding optional features. In this example, the transmitter is to establish over the wireless direct connection the wireless display service connection between the transmitter and the receiver.

Example 42 includes the transmitter configured for wireless display of any one of examples 40 to 41, including or excluding optional features. In this example, the wireless direct connection comprises Wi-Fi Direct®.

Example 43 includes the transmitter configured for wireless display of any one of examples 40 to 42, including or excluding optional features. In this example, the wireless display service connection comprises Miracast™, Google Chromecast™, or Apple AirPlay®.

Example 44 includes the transmitter configured for wireless display of any one of examples 40 to 43, including or excluding optional features. In this example, the instructions when executed by the processor cause the transmitter to acquire a license to obtain a first key, wherein to decrypt the first encrypted video comprises decrypting the first encrypted video with the first key, wherein to decrypt the first encrypted audio comprises decrypting the first encrypted audio with the first key, wherein to encrypt the decrypted video comprises encrypting the decrypted video with a second key different from the first key, and wherein to encrypt the decrypted audio comprises encrypting the decrypted audio with the second key. Optionally, the first key comprises a Digital Rights Management (DRM) key, wherein the second key comprises a High Definition Copy Protocol (HDCP) key.

Example 45 includes the transmitter configured for wireless display of any one of examples 40 to 44, including or excluding optional features. In this example, the instructions when executed by the processor cause the transmitter to packetize the decrypted video, packetize the decrypted audio, and compress a user interface (UI) stream, wherein to combine into a second encrypted content comprises combining the compressed UI stream with the second encrypted video and the second encrypted audio to give the second encrypted content without composing Example 46 includes the transmitter configured for wireless display of any one of examples 40 to 45, including or excluding optional features. In this example, the first encrypted content comprises a first-key encrypted content, and wherein the second encrypted content comprises a second-key encrypted content.

It is to be understood that specifics in the aforementioned examples may be used anywhere in one or more embodiments. For instance, all optional features of the computing device described above may also be implemented with respect to either of the methods described herein or a computer-readable medium.

Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A transmitter configured for wireless display, comprising:
    a processor; and
    memory storing instructions that when executed by the processor cause the transmitter to:
        divide encrypted content into video content and audio content;
        acquire a license to obtain a first key;
        decrypt the video content;
        decrypt the audio content;
        packetize the decrypted video content;
        packetize the decrypted audio content;
        encrypt the decrypted video content without decoding the decrypted video content;
        encrypt the decrypted audio content without decoding the decrypted audio content;
        compress a user interface (UI) stream;
        combine the compressed UI stream, the encrypted video content and the encrypted audio content without composing, wherein the encrypted content comprises a first-key encrypted content, and wherein the combined encrypted video content and encrypted audio content comprises a second-key encrypted content; and
        transfer the combined compressed UI stream, encrypted video content and encrypted audio content wirelessly to a receiver.

2. The transmitter of claim 1, wherein the transmitter is a computing device and is to negotiate a wireless display connection with the receiver to wirelessly couple the transmitter and the receiver, wherein the combined encrypted content is transferred over the wireless display connection to the receiver in response to initiation of the transfer by a user.

3. The transmitter of claim 2, wherein the wireless display connection is compliant with a wireless standard.

4. The transmitter of claim 1, wherein the first key comprises a Digital Rights Management (DRM) key, and wherein the second key comprises a High Definition Copy Protocol (HDCP) key.

5. A method of wireless display, comprising:
    dividing encrypted content into video content and audio content;
    decrypting the video content;
    decrypting the audio content;
    packetizing the decrypted video content;
    packetizing the decrypted audio content;
    encrypting the decrypted video content without decoding the decrypted video content;
    encrypting the decrypted audio content without decoding the decrypted audio content;
    combining the encrypted video content and the encrypted audio content;
    compressing a user interface (UI) stream;
    combining the compressed UI stream with the encrypted video content and the encrypted audio content, wherein the encrypted content comprises a first-key encrypted content, and wherein the encrypted video content and the encrypted audio content comprise a second-key encrypted content; and transferring the combined compressed UI stream, encrypted video content and encrypted audio content wirelessly to a receiver.

6. The method of claim 5, comprising negotiating a wireless connection between the transmitter and the receiver to wirelessly couple the transmitter and the receiver.

7. The method of claim 6, wherein the wireless connection is compliant with a wireless standard, and wherein the wireless display connection is compliant with a wireless standard.

8. The method of claim 5, comprising the transmitter performing a license acquisition to obtain a first key, wherein the processing comprises:
   decrypting the video content and the audio content with the first key; and
   encrypting the decrypted video content and encrypted audio content with a second key different than the first key.

9. The method of claim 8, wherein the first key comprises a Digital Rights Management (DRM) key, and wherein the second key comprises a High Definition Copy Protocol (HDCP) key.

10. The method of claim 5, wherein packetizing comprises subjecting the decrypted video content and/or the decrypted video content to a packetized elementary stream (PES) packetizer.

11. The method of claim 5, comprising negotiating a wireless connection between the transmitter and the receiver to wirelessly couple the transmitter and the receiver, wherein the transmitter does not decode the decrypted video content, and wherein the transmitter does not decode the decrypted audio content.

12. The method of claim 11, wherein the wireless connection is compliant with a wireless standard.

13. The method of claim 5, comprising the transmitter receiving the encrypted content and performing a license acquisition to obtain a first key, wherein decrypting the video content comprises decrypting the video content with the first key, and wherein decrypting the audio content comprises decrypting the audio content with the first key.

14. The method of claim 13, wherein encrypting the decrypted video content comprises encrypting the decrypted video content with a second key different than the first key, and wherein encrypting the decrypted audio content comprises encrypting the decrypted audio content with the second key.

15. The method of claim 5, comprising the transmitter packetizing the decrypted video content, and the transmitter packetizing the decrypted audio content, wherein the encrypted content comprises a first-key encrypted content, and wherein the combined encrypted video content and encrypted audio content comprises a second-key encrypted content.

16. The method of claim 5, comprising the transmitter compressing a user interface (UI) stream, and wherein combining the encrypted video content and the encrypted audio content comprises the transmitter combining the compressed UI stream with the encrypted video content and the encrypted audio content without composing.

17. A tangible, non-transitory, computer-readable medium comprising instructions that, when executed by a processor of a computing device, cause the computing device to:
   divide encrypted content into video content and audio content;
   acquire a license to obtain a first key;
   decrypt the video content with the first key;
   decrypt the audio content with the first key;
   encrypt the decrypted video content without decoding the decrypted video content;
   encrypt the decrypted audio content without decoding the decrypted audio content;
   combine the encrypted video content and the encrypted audio content; and
   transfer the combined encrypted video content and encrypted audio content wirelessly to a receiver, wherein to transfer the combined encrypted video content and encrypted audio content wirelessly, the computing device is to:
      negotiate a wireless connection between a transmitter and the receiver to wirelessly couple the transmitter and the receiver, wherein the transmitter comprises the computing device; and
      establish a wireless display service connection between the transmitter and the receiver, wherein the transfer of the combined encrypted video content and encrypted audio content is in response to initiation of the transfer by a user.

18. The non-transitory, computer-readable medium of claim 17, wherein:
   the encrypted content comprises content encrypted by a first key;
   the video content comprises video encrypted by the first key;
   the audio content comprises audio encrypted by the first key;
   the combined encrypted video content and encrypted audio content comprises content encrypted by a second key different than the first key;
   the encrypted video content comprises video encrypted by the second key; and
   the encrypted audio content comprises audio encrypted by the second key.

19. The non-transitory, computer-readable medium of claim 17, wherein the instructions when executed by the processor cause the computing device to packetize the decrypted video and packetize the decrypted audio, wherein to encrypt the decrypted video content comprises encrypting the decrypted video content with a second key different from the first key, and wherein to encrypt the decrypted audio content comprises encrypting the decrypted audio content with the second key.

20. The non-transitory, computer-readable medium of claim 17, wherein the instructions when executed by the processor cause the computing device to compress a user interface (UI) stream, and wherein to combine the encrypted video content and the encrypted audio content comprises combining the encrypted video content and the encrypted audio content without composing.

21. The non-transitory, computer-readable medium of claim 17, wherein the instructions when executed by the processor cause the computing device to negotiate a wireless connection with the receiver.

22. The transmitter of claim 1, wherein the instructions when executed by the processor cause the transmitter to acquire a license to obtain a first key, wherein to decrypt the video content comprises decrypting the video content with the first key, wherein to decrypt the audio content comprises decrypting the audio content with the first key, wherein to encrypt the decrypted video content comprises encrypting the decrypted video content with a second key different from the first key, and wherein to encrypt the decrypted audio content comprises encrypting the decrypted audio content with the second key.

* * * * *